(12) United States Patent
Hirukawa et al.

(10) Patent No.: US 12,362,092 B2
(45) Date of Patent: Jul. 15, 2025

(54) MULTILAYER COIL COMPONENT

(71) Applicant: Murata Manufacturing Co., Ltd., Kyoto-fu (JP)

(72) Inventors: Atsuo Hirukawa, Nagaokakyo (JP); Kenjirou Koshiji, Nagaokakyo (JP); Shun Takai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 633 days.

(21) Appl. No.: 17/839,107

(22) Filed: Jun. 13, 2022

(65) Prior Publication Data

US 2022/0399160 A1   Dec. 15, 2022

(30) Foreign Application Priority Data

Jun. 14, 2021 (JP) .................................. 2021-098893

(51) Int. Cl.
*H01F 27/32* (2006.01)
*H01F 17/00* (2006.01)
*H01F 27/29* (2006.01)

(52) U.S. Cl.
CPC ....... *H01F 27/323* (2013.01); *H01F 17/0013* (2013.01); *H01F 27/292* (2013.01)

(58) Field of Classification Search
CPC ... H01F 27/323; H01F 17/0013; H01F 27/292
See application file for complete search history.

(56) References Cited

U.S. PATENT DOCUMENTS

| 12,033,786 | B2 * | 7/2024 | Lee | H01F 17/0013 |
| 2002/0167389 | A1 * | 11/2002 | Uchikoba | H01F 27/027 336/200 |
| 2005/0023501 | A1 * | 2/2005 | Ishida | H01F 41/0246 252/62.62 |
| 2009/0278627 | A1 * | 11/2009 | Umemoto | H01G 4/1209 336/200 |
| 2012/0119867 | A1 * | 5/2012 | Odahara | H01F 17/04 336/200 |
| 2017/0154720 | A1 | 6/2017 | Ohkubo et al. | |
| 2017/0345552 | A1 * | 11/2017 | Nakano | H01F 41/043 |
| 2019/0161398 | A1 * | 5/2019 | Kaneko | C03C 14/004 |
| 2019/0304656 | A1 * | 10/2019 | Hirukawa | H01F 27/2804 |
| 2022/0375675 | A1 | 11/2022 | Saito et al. | |

FOREIGN PATENT DOCUMENTS

| JP | H0677022 | A | * | 3/1994 |
| JP | 2011114173 | A | * | 6/2011 |
| JP | 2017-212372 | A | | 11/2017 |
| JP | 2018-035027 | A | | 3/2018 |
| JP | 2019-186255 | A | | 10/2019 |

* cited by examiner

*Primary Examiner* — Malcolm Barnes
(74) *Attorney, Agent, or Firm* — Studebaker Brackett PLLC

(57) ABSTRACT

A multilayer coil component that includes a multilayer body in which a plurality of insulating layers are stacked in a stacking direction and a coil inside the multilayer body, and outer electrodes that are on surfaces of the multilayer body and are electrically connected to the coil. The insulating layers include a spinel-structure ferrite phase and a ZnFe(BO$_3$)O-type crystalline phase.

20 Claims, 4 Drawing Sheets

MULTILAYER COIL COMPONENT

CROSS-REFERENCE TO RELATED APPLICATION

This application claims benefit of priority to Japanese Patent Application No. 2021-098893, filed Jun. 14, 2021, the entire content of which is incorporated herein by reference.

BACKGROUND

Technical Field

The present disclosure relates to a multilayer coil component.

Background Art

Japanese Unexamined Patent Application Publication No. 2017-212372 discloses a multilayer coil component using an element body including a magnetic part containing glass and ferrite and having good high-frequency characteristics.

However, in the multilayer coil component disclosed in Japanese Unexamined Patent Application Publication No. 2017-212372, stress that occurs during baking of the outer electrodes (base electrodes) may increase due to the difference between the coefficient of linear expansion of conductor portions (silver) buried in the magnetic part and the coefficient of linear expansion of the material constituting the magnetic part, and cracks may occur.

Glass has a lower deflective strength than ferrite, and therefore this problem is more pronounced than it would be in the case of a magnetic part consisting entirely of ferrite.

SUMMARY

The present disclosure provides a multilayer coil component in which the occurrence of cracks during the baking of outer electrodes can be suppressed.

A multilayer coil component of the present disclosure includes a multilayer body in which a plurality of insulating layers are stacked in a stacking direction and inside of which a coil is provided, and outer electrodes that are provided on surfaces of the multilayer body and are electrically connected to the coil. The insulating layers include a spinel-structure ferrite phase and a $ZnFe(BO_3)O$-type crystalline phase.

According to the present disclosure, a multilayer coil component can be provided in which the occurrence of cracks during baking of outer electrodes can be suppressed.

DETAILED DESCRIPTION

Hereafter, a multilayer coil component of the present disclosure will be described.

However, the present disclosure is not limited to the following configurations and modes and the present disclosure can be applied with appropriate modifications within a range that does not alter the gist of the present disclosure. Combinations of two or more preferable configurations or modes of the present disclosure described hereafter are also included in the scope of the present disclosure.

Figure 1:
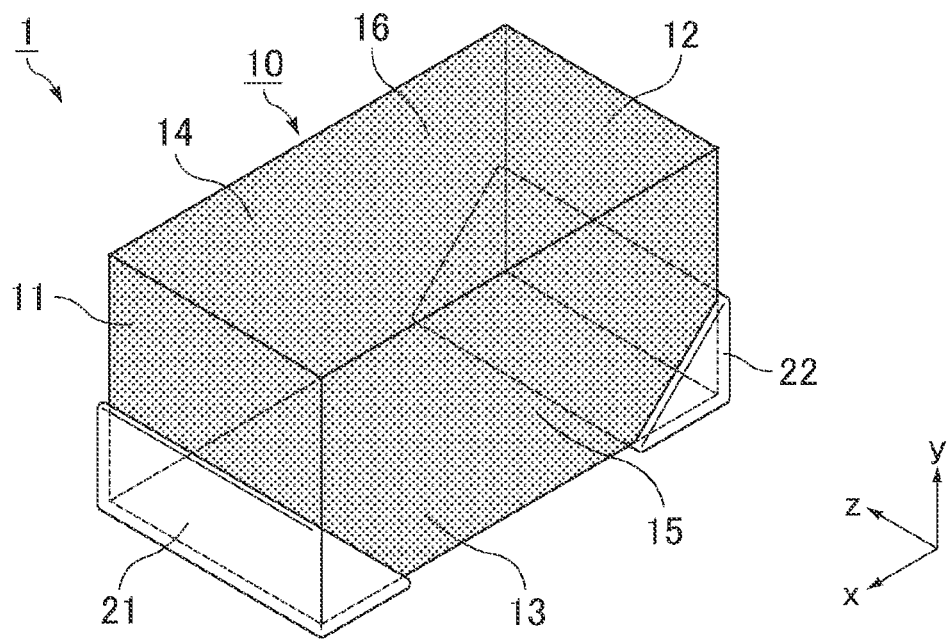
FIG. 1 is a perspective view schematically illustrating an example of a multilayer coil component of the present disclosure.

FIG. 1 is a perspective view schematically illustrating an example of a multilayer coil component of the present disclosure.

A multilayer coil component 1 illustrated in FIG. 1 includes a multilayer body 10, a first outer electrode 21, and a second outer electrode 22. The multilayer body 10 has a substantially rectangular parallelepiped shape having six surfaces, for example. The configuration of the multilayer body 10 will be described later, but the multilayer body 10 is formed by stacking a plurality of insulating layers in the stacking direction and has a coil provided thereinside. The first outer electrode 21 and the second outer electrode 22 are electrically connected to the coil.

In a multilayer coil component and a multilayer body described in the present specification, a length direction, a height direction, and a width direction are respectively taken to be an x direction, a y direction, and a z direction in FIG. 1. Here, the length direction (x direction), the height direction (y direction), and the width direction (z direction) are perpendicular to each other.

The length direction (x direction) is a direction that is parallel to the stacking direction.

As illustrated in FIG. 1, the multilayer body 10 has a first end surface 11 and a second end surface 12, which face each other in the length direction (x direction), a first main surface 13 and a second main surface 14, which face each other in the height direction (y direction) perpendicular to the length direction, and a first side surface 15 and a second side surface 16, which face each other in the width direction (z direction) perpendicular to the length direction and the height direction.

Although not illustrated in FIG. 1, corner portions and edge portions of the multilayer body 10 are preferably rounded. The term "corner portion" refers to a part of the multilayer body where three surfaces intersect and the term "edge portion" refers to a part of the multilayer body where two surfaces intersect.

The first outer electrode and the second outer electrode are outer electrodes that extend along a main surface of the multilayer body from at least part of each end surface of the multilayer body, for example.

In the multilayer coil component 1 illustrated in FIG. 1, the first outer electrode 21 is disposed so as to cover part of the first end surface 11 of the multilayer body 10 and so as to extend from the first end surface 11 and cover part of the first main surface 13.

The first outer electrode 21 covers a region of the first end surface 11 including an edge portion that intersects the first main surface 13.

In FIG. 1, the height of the part of the first outer electrode 21 that covers the first end surface 11 of the multilayer body 10 is constant, but the shape of the first outer electrode 21 is not particularly limited so long as the first outer electrode 21 covers part of the first end surface 11 of the multilayer body 10. For example, the first outer electrode 21 may have an arch-like shape that increases in height from the ends toward the center thereof on the first end surface 11 of the multilayer body 10. In addition, the length of the part of the first outer electrode 21 that covers the first main surface 13 of the multilayer body 10 is constant, but the shape of the first outer electrode 21 is not particularly limited so long as the first outer electrode 21 covers part of the first main surface 13 of the multilayer body 10. For example, the first outer electrode 21 may have an arch-like shape that increases in length from the ends toward the center thereof on the first main surface 13 of the multilayer body 10.

As illustrated in FIG. 1, the first outer electrode 21 may be additionally disposed so as to extend from the first end surface 11 and the first main surface 13 and cover part of the first side surface 15 and part of the second side surface 16. In this case, the parts of the first outer electrode 21 covering the first side surface 15 and the second side surface 16 are preferably formed in a diagonal shape relative to both the edge portions that intersect the first end surface 11 and the edge portions that intersect the first main surface 13. However, the first outer electrode 21 does not have to be disposed so as to cover part of the first side surface 15 and part of the second side surface 16.

In the multilayer coil component 1 illustrated in FIG. 1, the second outer electrode 22 is disposed so as to cover part of the second end surface 12 of the multilayer body 10 and so as to extend from the second end surface 12 and cover part of the first main surface 13.

Similarly to the first outer electrode 21, the second outer electrode 22 covers a region of the second end surface 12 that includes the edge portion that intersects the first main surface 13.

Similarly to the first outer electrode 21, the shape of the second outer electrode 22 is not particularly limited so long as the second outer electrode 22 covers part of the second end surface 12 of the multilayer body 10. For example, the second outer electrode 22 may have an arch-like shape that increases in height from the ends toward the center thereof on the second end surface 12 of the multilayer body 10. Furthermore, the shape of the second outer electrode 22 is not particularly limited so long as the second outer electrode 22 covers part of the first main surface 13 of the multilayer body 10. For example, the second outer electrode 22 may have an arch-like shape that increases in length from the ends toward the center thereof on the first main surface 13 of the multilayer body 10.

Similarly to the first outer electrode 21, the second outer electrode 22 may be additionally disposed so as to extend from the second end surface 12 and the first main surface 13 and cover part of the first side surface 15 and part of the second side surface 16. In this case, the parts of the second outer electrode 22 covering the first side surface 15 and the second side surface 16 are preferably formed in a diagonal shape relative to both the edge portions that intersect the second end surface 12 and the edge portions that intersect the first main surface 13. However, the second outer electrode 22 does not have to be disposed so as to cover part of the first side surface 15 and part of the second side surface 16.

The first outer electrode 21 and the second outer electrode 22 are disposed in the manner described above, and therefore the first main surface 13 of the multilayer body 10 serves as a mounting surface when the multilayer coil component 1 is mounted on a substrate.

Furthermore, different from the form illustrated in FIG. 1, the first outer electrode may cover the entirety of the first end surface of the multilayer body and may extend from the first end surface and cover part of the first main surface, part of the second main surface, part of the first side surface, and part of the second side surface.

In addition, the second outer electrode may cover the entirety of the second end surface of the multilayer body and may extend from the second end surface and cover part of the first main surface, part of the second main surface, part of the first side surface, and part of the second side surface.

In this case, any one out of the first main surface, the second main surface, the first side surface, and the second side surface of the multilayer body may serve as a mounting surface.

Although the size of the multilayer coil component of the present disclosure is not particularly limited, the multilayer coil component is preferably the 0603 size, the 0402 size, or the 1005 size.

The insulating layers include a spinel-structure ferrite phase and a $ZnFe(BO_3)O$-type crystalline phase.

In the case where the insulating layers constituting the multilayer coil component include a spinel-structure ferrite phase, the coefficient of linear expansion of the insulating layers at high temperatures is increased and the occurrence of cracks during baking of the outer electrodes can be suppressed when the insulating layers further include a $ZnFe(BO_3)O$-type crystalline phase.

From the viewpoint of effectively suppressing the occurrence of cracks during baking of the outer electrodes, the coefficient of linear expansion of the insulating layers at 700° C. is preferably $9 \times 10^{-6}$/K or higher and more preferably $10 \times 10^{-6}$/K or higher.

In particular, when the coefficient of linear expansion of the insulating layers at 700° C. is $10 \times 10^{-6}$/K or higher, it is possible to prevent the occurrence of cracks during baking of the outer electrodes.

The upper limit of the coefficient of linear expansion of the insulating layers at 700° C. is not particularly limited, but may be $14 \times 10^{-6}$/K or lower, $13 \times 10^{-6}$/K or lower, or $12.5 \times 10^{-6}$/K or lower, for example.

From the viewpoint of effectively suppressing the occurrence of cracks during baking of outer electrodes containing silver, the difference between the coefficients of linear expansion of the insulating layers and silver at 700° C. is preferably $9.9 \times 10^{-6}$/K or lower and more preferably $8.9 \times 10^{-6}$/K or lower.

In particular, when the difference between the coefficients of linear expansion of the insulating layers and silver at 700° C. is $8.9 \times 10^{-6}$/K or lower, it is possible to prevent the occurrence of cracks during baking of the outer electrodes.

Note that "the difference between the coefficients of linear expansion of the insulating layers and silver" means a value obtained by subtracting the coefficient of linear expansion of the insulating layers from the coefficient of linear expansion of silver.

The lower limit of the difference between the coefficients of linear expansion of the insulating layers and silver at 700° C. is not particularly limited, but may be $4.9 \times 10^{-6}$/K or higher, $5.9 \times 10^{-6}$/K or higher, or $6.4 \times 10^{-6}$/K or higher, for example.

The spinel-structure ferrite phase is a phase containing a ferrite material having a spinel structure (spinel-type ferrite). This ferrite phase may be a phase composed of only a ferrite material having a spinel structure.

The ZnFe(BO$_3$)O-type crystalline phase is a phase containing ZnFe(BO$_3$)O crystals. This crystalline phase may be a phase composed of only ZnFe(BO$_3$)O crystals.

The insulating layers preferably further contain a forsterite crystalline phase.

The occurrence of cracks during baking of the outer electrodes can be prevented when the insulating layers constituting the multilayer coil component further contain a forsterite crystalline phase.

The forsterite crystalline phase is a phase containing forsterite (2MgO·SiO$_2$) crystals. This crystalline phase may be a phase composed of only forsterite crystals.

The insulating layers preferably further contain a quartz crystalline phase.

The quartz crystalline phase is a phase containing quartz (SiO$_2$) crystals. This crystalline phase may be a phase composed of only quartz crystals.

The insulating layers may further contain a MgFe$_2$(BO$_3$)O$_2$-type crystalline phase.

The MgFe$_2$(BO$_3$)O$_2$-type crystalline phase is a phase containing MgFe$_2$(BO$_3$)O$_2$ crystals. This crystalline phase may be a phase composed of only MgFe$_2$(BO$_3$)O$_2$ crystals.

When the insulating layers contain a MgFe$_2$(BO$_3$)O$_2$-type crystalline phase, the insulating layers do not have to contain a forsterite crystalline phase, and conversely, when the insulating layers contain a forsterite crystalline phase, the insulating layers do not have to contain a MgFe$_2$(BO$_3$)O$_2$-type crystalline phase.

The above-described spinel-structure ferrite phase, ZnFe(BO$_3$)O-type crystalline phase, forsterite crystalline phase, quartz crystalline phase, and MgFe$_2$(BO$_3$)O$_2$-type crystalline phase can all be identified using an X-ray diffraction method.

The ferrite phase is preferably a spinel-structure magnetic phase containing at least Fe, Ni, Zn, and Cu and the insulating layers preferably contain a non-magnetic phase containing at least a ZnFe(BO$_3$)O-type crystalline phase and Si.

As described above, the ferrite phase is preferably a spinel-structure magnetic phase containing at least Fe, Ni, Zn, and Cu, and in this case, the ferrite phase (magnetic phase) may further include Co, Bi, Sn, Mn, and so on.

The ferrite material having a spinel structure included in the ferrite phase (magnetic phase) is preferably a Ni—Cu—Zn-based ferrite material, and the ferrite phase (magnetic phase) is preferably a Ni—Cu—Zn-based ferrite material. The inductance of the multilayer coil component is increased when the ferrite phase (magnetic phase) consists of a Ni—Cu—Zn-based ferrite material.

The Ni—Cu—Zn-based ferrite material may further include additives such as Co, Bi, Sn, and Mn and unavoidable impurities.

In addition, the ferrite phase (magnetic phase) may be a phase containing Fe, Ni, Zn, and Cu when elementally analyzed. Furthermore, the magnetic phase may be a phase further containing Co, Bi, Sn, Mn, and so on when elementally analyzed.

The ferrite phase (magnetic phase) preferably contains Fe at from 40 mol % to 49.5 mol % in terms of Fe$_2$O$_3$, Zn at from 2 mol % to 35 mol % in terms of ZnO, Cu at from 6 mol % to 13 mol % in terms of CuO, and Ni at from 10 mol % to 45 mol % in terms of NiO.

The non-magnetic phase is a phase containing a non-magnetic material and contains at least a ZnFe(BO$_3$)O-type crystalline phase and Si. The non-magnetic phase may be a phase composed of only a non-magnetic material.

Other than ZnFe(BO$_3$)O, examples of a non-magnetic material constituting the non-magnetic phase may include a dielectric glass material, forsterite (2MgO·SiO$_2$), and wilmite (aZnO·SiO$_2$ (a is from 1.8 to 2.2)).

The non-magnetic phase preferably contains a dielectric glass material.

The dielectric constant of the insulating layers can be reduced when the non-magnetic phase includes a dielectric glass material. This reduction in the dielectric constant of the insulating layers results in a reduction in loss of the multilayer coil component caused by LC resonance. Specifically, a drop in the transmission coefficient S21 caused by LC resonance is shifted in the direction towards higher frequencies, and the transmission coefficient S21 in a frequency range up to 60 GHz, for example, can be improved. Therefore, excellent high-frequency characteristics can be realized for the multilayer coil component of the present disclosure.

Borosilicate glass is preferred as the dielectric glass material.

The borosilicate glass preferably contains Si at from 70 wt % to 85 wt % in terms of SiO$_2$, B at from 10 wt % to 25 wt % in terms of B$_2$O$_3$, an alkali metal A at from 0.5 wt % to 5 wt % in terms of A$_2$O, and Al at from 0 wt % to 5 wt % in terms of Al$_2$O$_3$. K, Na, or the like may be used as the alkali metal A.

The non-magnetic phase may further contain forsterite (2MgO·SiO$_2$) as filler and may further contain quartz (SiO$_2$) or the like as a dielectric glass material and filler.

In other words, the non-magnetic phase may further contain a forsterite crystalline phase, a quartz crystalline phase, and so on as described above.

The ferrite phase (magnetic phase) and the non-magnetic phase can be distinguished from each other as follows. First, a cross section of the multilayer body of the multilayer coil component along the stacking direction is exposed by grinding down the multilayer body and then elemental mapping is performed on the multilayer body by performing scanning transmission electron microscopy-energy dispersive X-ray analysis (STEM-EDX). The two phases are distinguished from each other by regarding regions where the element Fe exists (preferably, regions where the element Fe, the element Ni, the element Zn, and the element Cu exist) as regions constituting the ferrite phase and regions other than those constituting the ferrite phase as regions constituting the non-magnetic phase.

A cross section taken along the stacking direction is a cross section like that illustrated in FIG. 2 described later.

The non-magnetic material constituting the non-magnetic phase preferably has a lower dielectric constant than the ferrite material constituting the ferrite phase (magnetic phase).

The relative dielectric constant of the ferrite material may be, for example, from 14.0 to 15.5.

The relative dielectric constant of the non-magnetic material is preferably lower than the relative dielectric constant of the magnetic material, and is for example, preferably 7.0 or lower and more preferably 5.0 or lower. The lower limit of the relative dielectric constant of the non-magnetic material is not particularly limited, and may be 3.5 or higher, for example.

The structural formula of the ferrite material constituting the ferrite phase is determined and the structural formula of the non-magnetic material constituting the non-magnetic phase is determined by performing the above-mentioned element mapping in order to determine the relative dielectric constant of the ferrite material and the relative dielectric constant of the non-magnetic material. Then, the relative dielectric constants of compounds having these structural formulas are obtained from a publicly available database. The relative dielectric constant of the ferrite material and the relative dielectric constant of the non-magnetic material can be determined using this procedure.

In addition, the relative dielectric constant of the ferrite material may be measured under prescribed conditions by manufacturing a dielectric constant measurement test piece by molding the ferrite material into a prescribed shape and then forming electrodes on the test piece. Similarly the relative dielectric constant of the non-magnetic material may be measured by manufacturing a dielectric constant measurement test piece by molding the non-magnetic material into a prescribed shape.

The ratio of the volume of the non-magnetic phase to the total volume of the ferrite phase (magnetic phase) and the non-magnetic phase is preferably from 50 vol % to 90 vol %, more preferably from 60 vol % to 90 vol %, and still more preferably from 70 vol % to 90 vol %.

The ratio of the volume of the non-magnetic phase to the total volume of the ferrite phase (magnetic phase) and the non-magnetic phase is determined in the following way. First, a cross section of the multilayer body of the multilayer coil component along the stacking direction is exposed by grinding down the multilayer body up to a center part thereof in a direction perpendicular to the stacking direction.

Next, the ferrite phase and the non-magnetic phase are distinguished from each other as described above by extracting three 50 μm square regions from the vicinity of the center of the exposed cross section and subjecting the regions to elemental mapping using scanning transmission electron microscopy-energy dispersive X-ray analysis. Then, the ratio of the area of the non-magnetic phase to the total area of the ferrite phase and the non-magnetic phase is measured using image analysis software from the obtained elemental mapping image for each of the three regions described above. After that, an average value is calculated from the measured values of these area ratios and this average value is taken to be the ratio of the volume of the non-magnetic phase to the total volume of the ferrite phase and the non-magnetic phase.

Next, an example of a coil built into the multilayer body of the multilayer coil component will be described.

The coil is formed by electrically connecting together a plurality of coil conductors, which are stacked in the stacking direction together with the insulating layers.

Figure 2:
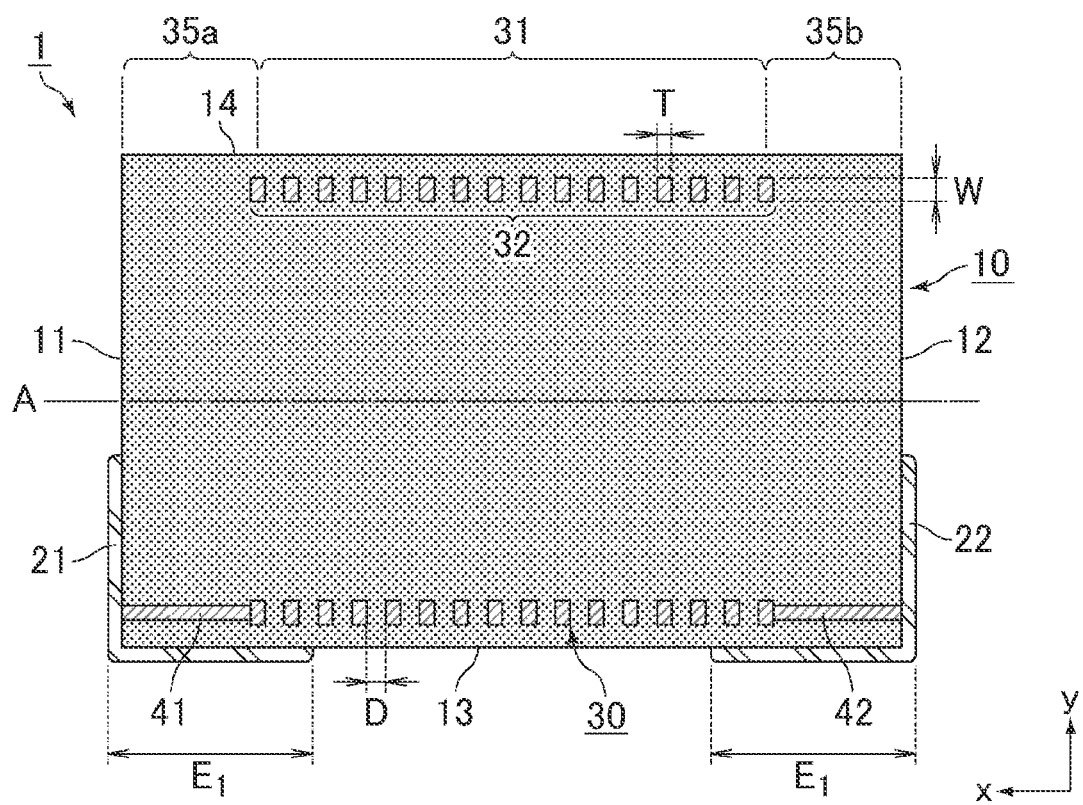
FIG. 2 is a sectional view schematically illustrating an example of the multilayer coil component of the present disclosure.
Figure 3:
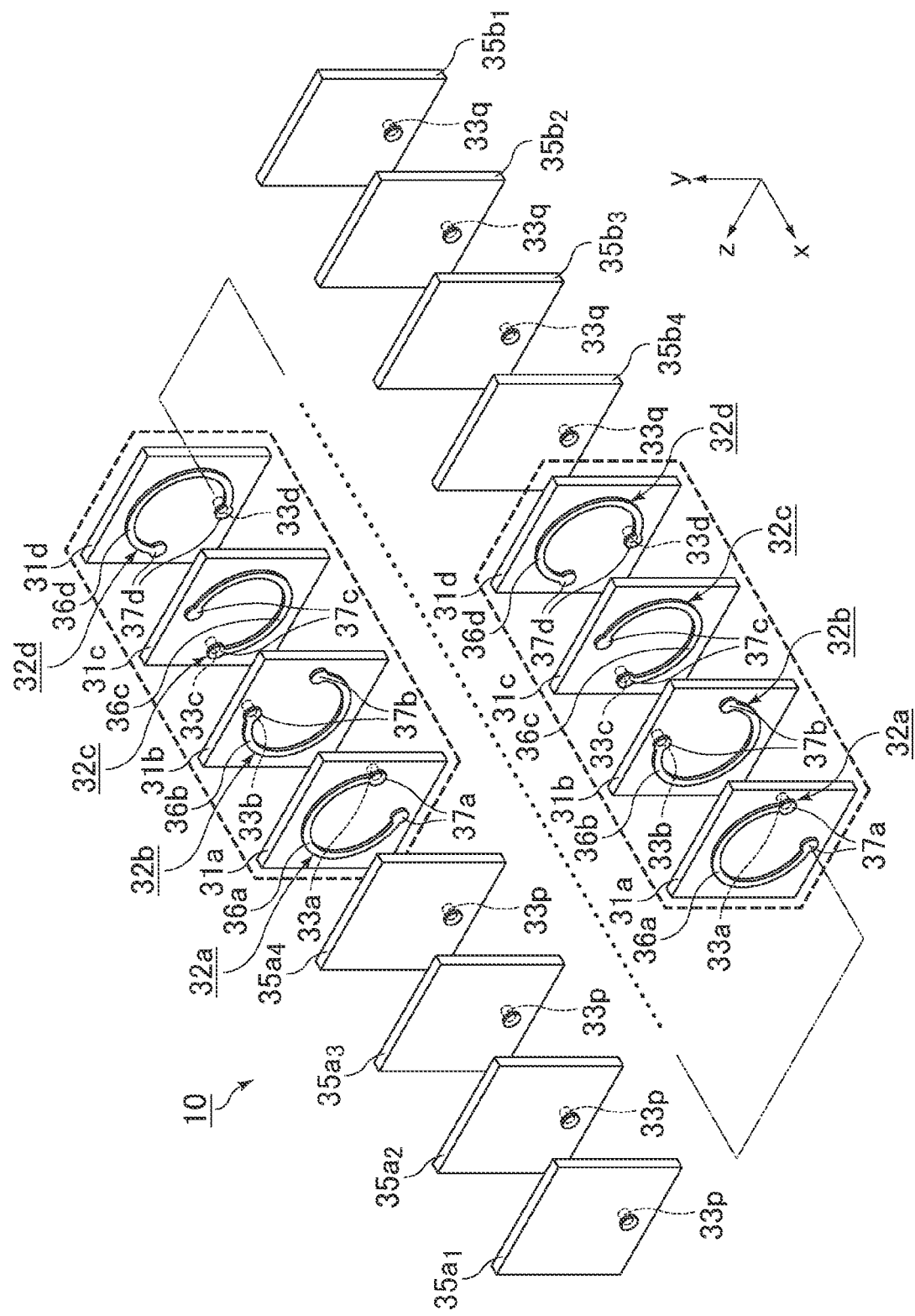
FIG. 3 is an exploded schematic perspective view schematically illustrating the states of insulating layers constituting the multilayer coil component illustrated in FIG. 2.
Figure 4:
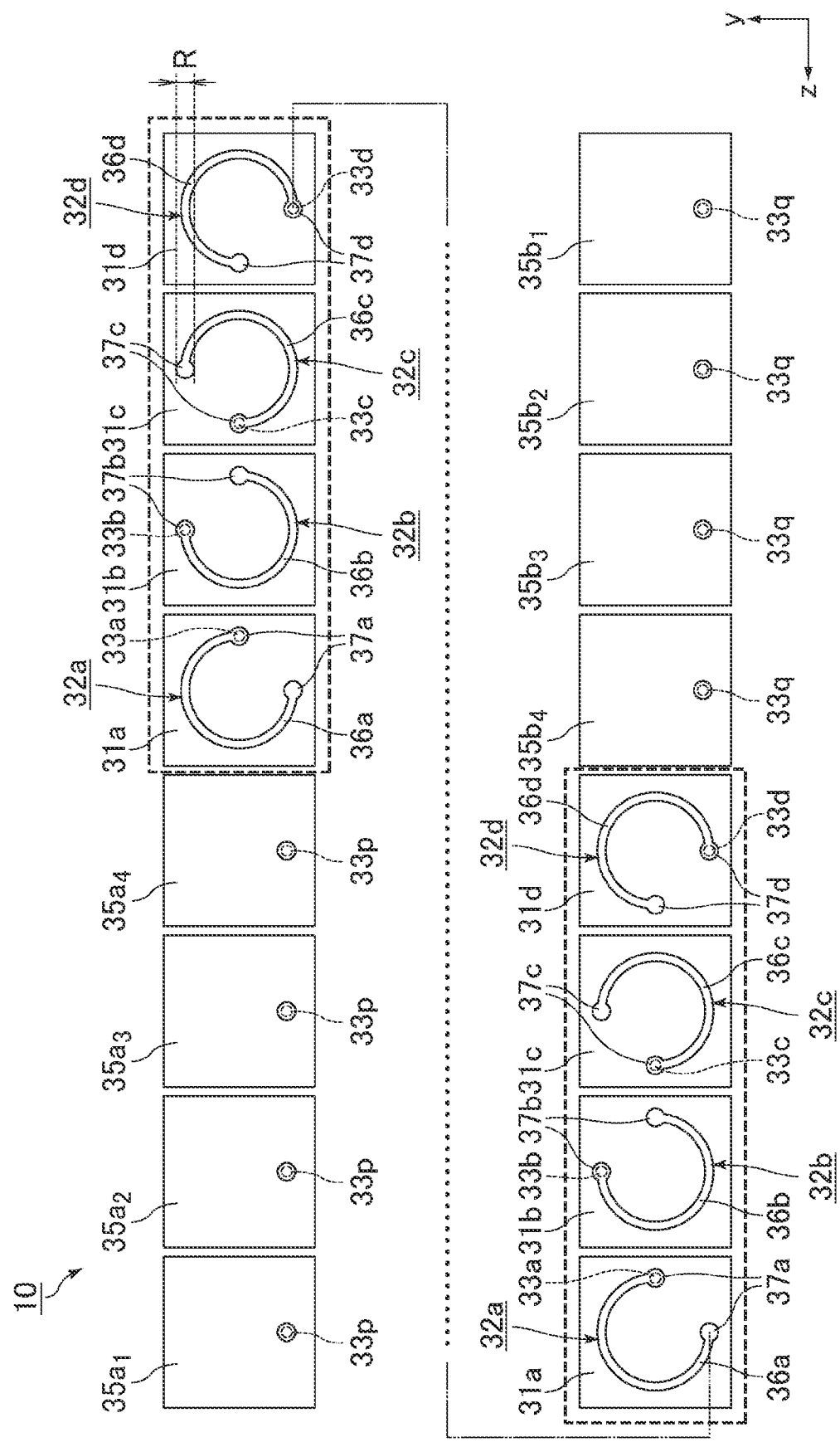
FIG. 4 is an exploded schematic plan view schematically illustrating the states of insulating layers constituting the multilayer coil component illustrated in FIG. 2.

FIG. 2 is a sectional view schematically illustrating an example of a multilayer coil component of the present disclosure, FIG. 3 is an exploded schematic perspective view schematically illustrating the states of insulating layers of the multilayer coil component illustrated in FIG. 2, and FIG. 4 is an exploded schematic plan view schematically illustrating the states of the insulating layers of the multilayer coil component illustrated in FIG. 2.

FIG. 2 illustrates insulating layers, coil conductors, connection conductors, and a stacking direction of the multilayer body in a schematic manner, and the actual shapes, connections, and so forth are not depicted with strict accuracy. For example, the coil conductors are connected to each other by via conductors.

As illustrated in FIG. 2, the multilayer coil component 1 includes: the multilayer body 10 having a coil 30 built into the inside thereof that is formed by electrically connecting together a plurality of coil conductors 32 that are stacked together with insulating layers; and the first outer electrode 21 and the second outer electrode 22, which are electrically connected to the coil 30.

For example, the multilayer body 10 includes a region in which the coil conductors 32 are disposed and regions in which a first connection conductor 41 and a second connection conductor 42 are disposed. The stacking direction of the multilayer body 10 and the axial direction of the coil 30 (coil axis A illustrated in FIG. 2) are parallel to the first main surface 13.

As illustrated in FIGS. 3 and 4, the multilayer body 10 includes an insulating layer 31a, an insulating layer 31b, an insulating layer 31c, and an insulating layer 31d as insulating layers 31 in FIG. 2. The multilayer body 10 includes an insulating layer $35a_1$, an insulating layer $35a_2$, an insulating layer $35a_3$, and an insulating layer $35a_4$ as insulating layers 35a in FIG. 2. The multilayer body 10 includes an insulating layer $35b_1$, an insulating layer $35b_2$, an insulating layer $35b_3$, and an insulating layer $35b_4$ as insulating layers 35b in FIG. 2.

The coil 30 includes a coil conductor 32a, a coil conductor 32b, a coil conductor 32c, and a coil conductor 32d as the coil conductors 32 in FIG. 2.

The coil conductor 32a, the coil conductor 32b, the coil conductor 32c, and the coil conductor 32d are respectively disposed on main surfaces of the insulating layer 31a, the insulating layer 31b, the insulating layer 31c, and the insulating layer 31d.

The length of each of the coil conductors 32a, 32b, 32c, and 32d is the length of ¾ of a turn of the coil 30. In other words, four coil conductors 32 are stacked on top of one another in order to form three turns of the coil 30. In the multilayer body 10, the coil conductor 32a, the coil conductor 32b, the coil conductor 32c, and the coil conductor 32d are repeatedly stacked as a single unit (three turns).

The coil conductor 32a includes a line portion 36a and a land portion 37a disposed at an end portion of the line portion 36a. The coil conductor 32b includes a line portion 36b and a land portion 37b disposed at an end portion of the line portion 36b. The coil conductor 32c includes a line portion 36c and a land portion 37c disposed at an end portion of the line portion 36c. The coil conductor 32d includes a line portion 36d and a land portion 37d disposed at an end portion of the line portion 36d.

A via conductor 33a, a via conductor 33b, a via conductor 33c, and a via conductor 33d are disposed so as to respectively penetrate through the insulating layer 31a, the insulating layer 31b, the insulating layer 31c, and the insulating layer 31d in the stacking direction.

The insulating layer 31a provided with the coil conductor 32a and the via conductor 33a, the insulating layer 31b provided with the coil conductor 32b and the via conductor 33b, the insulating layer 31c provided with the coil conductor 32c and the via conductor 33c, and the insulating layer 31d provided with the coil conductor 32d and the via conductor 33d are repeatedly stacked as a single unit (parts surrounded by dotted lines in FIGS. 3 and 4). Thus, the land portion 37a of the coil conductor 32a, the land portion 37b of the coil conductor 32b, the land portion 37c of the coil conductor 32c, and the land portion 37d of the coil conductor 32d are connected to each other by the via conductor 33a, the via conductor 33b, and the via conductor 33c, and the via conductor 33d. In other words, the land portions of coil conductors that are adjacent to each other in the stacking direction are connected to each other by the via conductors.

The solenoid-shaped coil 30 built into the multilayer body 10 is formed in the above-described manner.

In plan view in the stacking direction, the coil 30 formed of the coil conductors 32a, the coil conductors 32b, the coil conductors 32c, and the coil conductors 32d may have a circular shape or may have a polygonal shape. In the case where the coil 30 has a polygonal shape in plan view in the stacking direction, the coil diameter of the coil 30 is the diameter of an equivalent-area circle of the polygonal shape and the coil axis of the coil 30 is an axis that extends in the stacking direction through the center of the polygonal shape.

Via conductors 33$p$ are disposed so as to penetrate in the stacking direction through the insulating layer 35$a_1$, the insulating layer 35$a_2$, the insulating layer 35$a_3$, and the insulating layer 35$a_4$. Land portions connected to the via conductors 33$p$ may be disposed on the main surfaces of the insulating layer 35$a_1$, the insulating layer 35$a$2, the insulating layer 35$a_3$, and the insulating layer 35$a_4$.

The insulating layer 35$a_1$ provided with the via conductor 33$p$, the insulating layer 35$a_2$ provided with the via conductor 33$p$, the insulating layer 35$a_3$ provided with the via conductor 33$p$, and the insulating layer 35$a_4$ provided with the via conductor 33$p$ are stacked so as to overlap the insulating layer 31$a$ provided with the coil conductor 32$a$ and the via conductor 33$a$. As a result, the via conductors 33$p$ are connected to each other and form the first connection conductor 41 and the first connection conductor 41 is exposed at the first end surface 11. As a result, the first outer electrode 21 and the coil 30 (coil conductor 32$a$) are connected to each other via the first connection conductor 41.

The first connection conductor 41 is preferably connected in a straight line between the first outer electrode 21 and the coil 30. The phrase "the first connection conductor 41 is connected in a straight line between the first outer electrode 21 and the coil 30" means that the via conductors 33$p$ forming the first connection conductor 41 overlap one another in plan view in the stacking direction and it is not necessary for the via conductors 33$p$ to be perfectly aligned in a straight line.

Via conductors 33$q$ are disposed so as to penetrate in the stacking direction through the insulating layer 35$b_1$, the insulating layer 35$b_2$, the insulating layer 35$b_3$, and the insulating layer 35$b_4$. Land portions connected to the via conductors 33$q$ may be disposed on the main surfaces of the insulating layer 35$b_1$, the insulating layer 35$b_2$, the insulating layer 35$b_3$, and insulating layer 35$b_4$.

The insulating layer 35$b_1$ provided with the via conductor 33$q$, the insulating layer 35$b_2$ provided with the via conductor 33$q$, the insulating layer 35$b_3$ provided with the via conductor 33$q$, and the insulating layer 35$b_4$ provided with the via conductor 33$q$ are stacked so as to overlap the insulating layer 31$d$ provided with the coil conductor 32$d$ and the via conductor 33$d$. As a result, the via conductors 33$q$ are connected to each other and form the second connection conductor 42 and the second connection conductor 42 is exposed at the second end surface 12. As a result, the second outer electrode 22 and the coil 30 (coil conductor 32$d$) are connected to each other via the second connection conductor 42.

The second connection conductor 42 is preferably connected in a straight line between the second outer electrode 22 and the coil 30. The phrase "the second connection conductor 42 is connected in a straight line between the second outer electrode 22 and the coil 30" means that the via conductors 33$q$ forming the second connection conductor 42 overlap one another in plan view in the stacking direction and it is not necessary for the via conductors 33$q$ to be perfectly aligned in a straight line.

In the case where land portions are connected to the via conductors 33$p$ forming the first connection conductor 41 and the via conductors 33$q$ forming the second connection conductor 42, the shape of the first connection conductor 41 and the shape of the second connection conductor 42 refer to the shapes without the land portions.

In FIGS. 3 and 4, a case is exemplified in which four coil conductors 32 are stacked in order to form three turns of the coil 30, i.e., the repeating shape is the shape of ¾ of a turn, but the number of coil conductors 32 that are stacked in order to form one turn of the coil is not particularly limited.

For example, the number of coil conductors stacked in order to form one turn of the coil may be two, i.e., the repeating shape may be the shape of ½ a turn.

The coil conductors forming the coil preferably overlap in plan view in the stacking direction. In addition, the coil preferably has a circular shape in plan view in the stacking direction. In the case where the coil includes land portions, the shape of the coil is taken to be the shape obtained when the land portions are removed (i.e., the shape of the line portions).

In addition, in the case where land portions are connected to the via conductors forming the connection conductors, the shape of the connection conductors is the shape obtained when the land portions are removed (i.e., the shape of the via conductors).

The coil conductors illustrated in FIG. 3 are shaped so that the repeating pattern has a circular shape, but the coil conductors may instead be shaped so that the repeating pattern has a polygonal shape such as a quadrangular shape.

In addition, the repeating shape of the coil conductors may be a ½ turn shape rather than a ¾ turn shape.

The first outer electrode and the second outer electrode may have a single layer structure or may have a multilayer structure.

When the first outer electrode and the second outer electrode each have a single layer structure, for example, silver, gold, copper, palladium, nickel, aluminum, or an alloy containing at least one of these metals may be used as the constituent material of the outer electrodes, and among these materials, silver is most suitable.

When the first outer electrode and the second outer electrode each have a multilayer structure, each outer electrode may include, for example, a base electrode layer containing silver, a nickel coating, and a tin coating in order from the side near the surface of the multilayer body. Furthermore, each outer electrode may include, for example, a base electrode layer containing silver, a nickel coating, and a gold coating in order from the side near the surface of the multilayer body.

In a multilayer coil component having the configuration illustrated in FIGS. 2, 3, and 4, when the size of the multilayer coil component is the 0603 size, the multilayer coil component is preferably designed as follows in order to further improve the high-frequency characteristics.

The number of turns of the coil is preferably from 33 turns to 42 turns. When the number of turns lies in this range, the total electrostatic capacitance between the coil conductors can be reduced and therefore the transmission coefficient S21 can be made to lie in a suitable range.

In addition, the coil length is preferably from 0.49 mm to 0.55 mm.

The width of the coil conductors is preferably from 45 μm to 75 μm. The width of the coil conductors is a dimension indicated by double arrows W in FIG. 2.

The thickness of the coil conductors is preferably from 3.5 μm to 6.0 μm. The thickness of the coil conductors is a dimension indicated by double arrows T in FIG. 2.

The distance between the coil conductors is preferably from 3.0 μm to 5.0 μm. The distance between the coil conductors is a dimension indicated by double arrows D in FIG. 2.

The diameter of the land portions of the coil conductors is preferably from 30 μm to 50 μm. The diameter of the land portions of the coil conductors is a dimension indicated by double arrows R in FIG. 4.

When the first main surface of the multilayer body is used as the mounting surface, the length of the part of the first outer electrode that covers the first main surface of the multilayer body and the length of the part of the second outer electrode that covers the first main surface of the multilayer body are preferably 0.20 mm or lower. Furthermore, these lengths are preferably 0.10 mm or higher.

The length of the part of the first outer electrode covering the first main surface of the multilayer body and the length of the part of the second outer electrode covering the first main surface of the multilayer body are dimensions indicated by double arrows E1 in FIG. 2.

Note that in the multilayer coil component illustrated in FIGS. 2 to 4, the stacking direction of the insulating layers and the direction of the coil axis of the coil are parallel to the first main surface, which is the mounting surface, and the length direction of the multilayer body, but these directions are not particularly restricted, and for example may be perpendicular to the first main surface, which is mounting surface, of the multilayer body, or may be parallel to the first main surface, which is mounting surface, and the width direction of the multilayer body.

The multilayer coil component of the present disclosure is manufactured using the following method, for example.

Ferrite Material (Magnetic Material) Manufacturing Process $Fe_2O_3$, ZnO, CuO, and NiO are weighed so as to be at a prescribed ratio. These oxides may contain unavoidable impurities. Next, a slurry is prepared by wet mixing these weighed materials together and then pulverizing the materials. At this time, additives such as $Mn_3O_4$, $Bi_2O_3$, $Co_3O_4$, $SiO_2$, and $SnO_2$ may be added. The resulting slurry is dried and then preliminarily fired. The preliminary firing temperature is, for example, from 700° C. to 800° C. The preliminary firing time is from 2 hours to 5 hours, for example. In this way, a powdered ferrite material (magnetic material) is manufactured.

The ferrite material preferably contains $Fe_2O_3$ at from 40 mol % to 49.5 mol %, ZnO at from 2 mol % to 35 mol %, CuO at from 6 mol % to 13 mol %, and NiO at from 10 mol % to 45 mol %.

Non-Magnetic Material Manufacturing Process

A non-magnetic material powder is weighed. A glass powder containing an alkali metal, such as potassium, and boron, silicon, and aluminum in prescribed proportions is prepared as borosilicate glass, which is a dielectric glass material. Furthermore, a forsterite powder is prepared as a filler. Quartz powder may be additionally prepared as a dielectric glass material and filler.

The borosilicate glass preferably contains Si at from 70 wt % to 85 wt % in terms of $SiO_2$, B at from 10 wt % to 25 wt % in terms of $B_2O_3$, an alkali metal A at from 0.5 wt % to 5 wt % in terms of $A_2O$, and Al at from 0 wt % to 5 wt % in terms of $Al_2O_3$.

Green Sheet Manufacturing Process

The ferrite material (magnetic material) and the non-magnetic material are weighed in a prescribed ratio. Next, these weighed materials are mixed with an organic binder such as polyvinyl butyral resin, an organic solvent such as ethanol or toluene, a plasticizer, and so forth and then the mixture is pulverized to produce a slurry. The obtained slurry is then molded into a sheet of a prescribed thickness using a doctor blade method or the like and then punched into a prescribed shape such as a rectangular shape to produce green sheets.

The thickness of the green sheets is preferably from 20 μm to 30 μm.

The ferrite material (magnetic material) and the non-magnetic material are preferably mixed after adjusting the ratio of the volume of the non-magnetic material to the total volume of the ferrite material and the non-magnetic material to be preferably from 50 vol % to 90 vol %, more preferably from 60 vol % to 90 vol %, and still more preferably from 70 vol % to 90 vol %.

Conductor Pattern Forming Process

First, via holes are formed by performing laser irradiation at prescribed locations on the green sheets.

Next, a conductive paste such as a silver paste is applied to the surfaces of the green sheets while filling the via holes by using a screen printing method or the like. Thus, coil-conductor conductor patterns, which are connected to via-conductor conductor patterns, are formed on the surfaces of the green sheets while forming the via-conductor conductor patterns inside the via holes in the green sheets. In this way, coil sheets are manufactured in which the coil-conductor conductor patterns and the via-conductor conductor patterns are formed on and in the green sheets. A plurality of the coil sheets are manufactured and coil-conductor conductor patterns corresponding to the coil conductors illustrated in FIGS. 3 and 4 and via-conductor conductor patterns corresponding to the via conductors illustrated in FIGS. 3 and 4 are formed on and in the coil sheets.

In addition, separately from the coil sheets, via sheets are manufactured in which via-conductor conductor patterns are formed in the green sheets by filling the via holes in the green sheets with a conductive paste such as a silver paste using a screen printing method or the like. A plurality of the via sheets are manufactured and via-conductor conductor patterns corresponding to the via conductors illustrated in FIGS. 3 and 4 are formed in the via sheets.

Multilayer Body Block Manufacturing Process

A multilayer body block is manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

First, individual chips are manufactured by cutting the multilayer body block into pieces of a prescribed size using a dicer or the like.

Next, the individual chips are fired. The firing temperature is, for example, from 900° C. to 920° C. Furthermore, the firing time is from 2 hours to 4 hours, for example.

By firing the individual chips, the green sheets of the coil sheets and the via sheets become insulating layers. As a result, multilayer bodies in each of which a plurality of insulating layers are stacked in the stacking direction, in this case, length direction are manufactured. The ferrite phase (magnetic phase) and the non-magnetic phase are formed in each multilayer body.

The coil-conductor conductor patterns and the via-conductor conductor patterns of the coil sheets become the coil conductors and the via conductors when the individual chips are fired. As a result, coils are manufactured in which a plurality of coil conductors are electrically connected to each other by the via conductors while being stacked in the stacking direction.

In this way, a multilayer body and a coil provided inside the multilayer body are manufactured. The stacking direction of the insulating layers and the direction of the coil axis of the coil are parallel to the first main surface, which is the mounting surface, of the multilayer body and are parallel to the length direction in this case.

The via-conductor conductor patterns of the via sheets become the via conductors when the individual chips are fired. As a result, the first connection conductor and the second connection conductor are manufactured in which the plurality of via conductors are electrically connected to each other while being stacked in the length direction. The first connection conductor is exposed from the first end surface of the multilayer body. The second connection conductor is exposed from the second end surface of the multilayer body.

The corner portions and edge portions of the multilayer body may be rounded by performing barrel polishing, for example.

Outer Electrode Forming Process

First, a conductive paste containing silver and glass frit is applied to the first end surface and the second end surface of the multilayer body. Next, the base electrode layers are formed on the surfaces of the multilayer body by baking the resulting coatings. More specifically, a base electrode layer is formed so as to extend from the first end surface of the multilayer body across part of the first main surface, part of the first side surface, and part of the second side surface. In addition, a base electrode layer is formed so as to extend from the second end surface of the multilayer body across part of the first main surface, part of the first side surface, and part of the second side surface. The baking temperature of the coatings is from 800° C. to 820° C., for example.

After that, a nickel coating and a tin coating are sequentially formed on the surface of each base electrode layer by performing electrolytic plating or the like.

Thus, the first outer electrode that is electrically connected to the coil via the first connection conductor and the second outer electrode that is electrically connected to the coil via the second connection conductor are formed.

Thus, the multilayer coil component is manufactured.

EXAMPLES

Hereafter, examples that illustrate the multilayer coil component of the present disclosure in a more specific manner will be described. The present disclosure is not limited to the following examples.

Examples 1 to 12 and Comparative Examples 1 to 3

Multilayer bodies for multilayer coil components of Examples 1 to 12 and Comparative Examples 1 to 3 were manufactured using the following method.

Ferrite Material (Magnetic Material) Manufacturing Process

The main components were weighed so as to obtain a ratio of 48.0 mol % $Fe_2O_3$, 30.0 mol % ZnO, 14.0 mol % NiO, and 8.0 mol % CuO. Next, a slurry was manufactured by putting these weighed materials, pure water, and a dispersant into a ball mill along with PSZ media, mixing these materials together, and then pulverizing the mixture. The resulting slurry was dried and then preliminarily fired for two hours at 800° C. In this way, a powdered ferrite material (magnetic material) was manufactured.

Dielectric Glass Material Manufacturing Process

Borosilicate glass powder containing Si, B, K, and Al in prescribed proportions, and quartz powder as filler were prepared. The borosilicate glass powder and the quartz powder were weighed to obtain a ratio of borosilicate glass:quartz=75:25 by weight. Next, a slurry was manufactured by putting these weighed materials, pure water, and a dispersant into a ball mill along with PSZ media, mixing these materials together, and then pulverizing the mixture. Then, a powdered dielectric glass material was manufactured by drying the obtained slurry.

Forsterite Preparing Process

Forsterite powder was prepared as a filler.

The dielectric glass material and the forsterite are both non-magnetic materials.

Green Sheet Manufacturing Process

The ferrite material, the dielectric glass material, and the forsterite were weighed so that the volume ratio between the ferrite material, the dielectric glass material, and the forsterite had the values listed in Table 1 below. Next, a slurry was manufactured by putting these weighed materials, a polyvinyl butyral resin serving as an organic binder, and ethanol and toluene serving as organic solvents into a ball mill along with PSZ media, mixing these material together, and then pulverizing the mixture. The obtained slurry was then molded into a sheet of a prescribed thickness using a doctor blade method and then punched into a prescribed shape to produce green sheets.

Conductor Pattern Forming Process

An inner-conductor conductive paste containing silver powder and an organic vehicle was prepared.

Coil sheets were obtained by forming via holes at prescribed locations in green sheets, forming via conductors by filling the via holes with the conductive paste, and forming coil conductor patterns by performing printing.

Separately, via holes were formed by irradiating prescribed locations on green sheets with a laser. Via sheets were obtained by forming via conductors by filling the via holes with the conductive paste.

Multilayer Body Block Manufacturing Process

A multilayer body block was manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

Individual chips were manufactured by cutting the multilayer body block into individual pieces using a dicer. Next, multilayer bodies were obtained by firing the individual chips at 920° C. for 4 hours in a firing furnace.

Outer Electrode Forming Process

An outer-electrode conductive paste containing silver powder and glass frit was poured into a coating forming tank in order to form a coating film of a prescribed thickness. The places where the outer electrodes are to be formed on each multilayer body were immersed in the coating film.

After the immersion, each multilayer body was baked at a temperature of around 800° C. and in this way the base electrode layers of the outer electrodes were formed. The thickness of the base electrode layers was around 5 μm.

Next, the outer electrodes were formed by sequentially forming a nickel coating and a tin coating on each base electrode layer by performing electrolytic plating.

The multilayer coil components of Examples 1 to 12 and Comparative Examples 1 to 3 were manufactured as described above.

Regarding the size of each manufactured multilayer coil component, the dimension in the length direction was 0.6 mm, the dimension in the height direction was 0.3 mm, and the dimension in the width direction was 0.3 mm.

Examples 1 to 12 have compositions in which the mixing ratio of the ferrite material, the dielectric glass material, and the forsterite was varied and Comparative Examples 1 to 3 have compositions in which forsterite was not used.

Furthermore, the manufactured green sheets were stacked, pressure bonded, cut with a dicer, and then fired in a firing furnace at 920° C. for 4 hours to produce prism-shaped test pieces having a width of around 1 mm, a length of around 5 mm, and a height of around 1 mm after firing.

X-Ray Diffraction

The manufactured prism-shaped test pieces were pulverized into a powder and evaluated using X-ray diffraction to obtain X-ray diffraction patterns for 2θ from 10° to 100°. A Cu-Kα1 line was used as the X-ray source.

The obtained X-ray diffraction patterns were analyzed for the appearance of diffraction peaks originating from spinel-type ferrite, quartz crystal, crystals represented by $MgFe_2(BO_3)O_2$ (hereafter, referred to as crystals A), crystals represented by $ZnFe(BO_3)O$ (hereafter, referred to as crystals B), and forsterite. The results are illustrated in Table 1 below.

In Table 1, a case where a diffraction peak originating from any of the crystalline phases appeared is indicated by "○" and a case where a diffraction peak did not appear is indicated by "x". The X-ray diffraction pattern of Example 6 is illustrated in FIG. 5 as a representative example.

Figure 5:
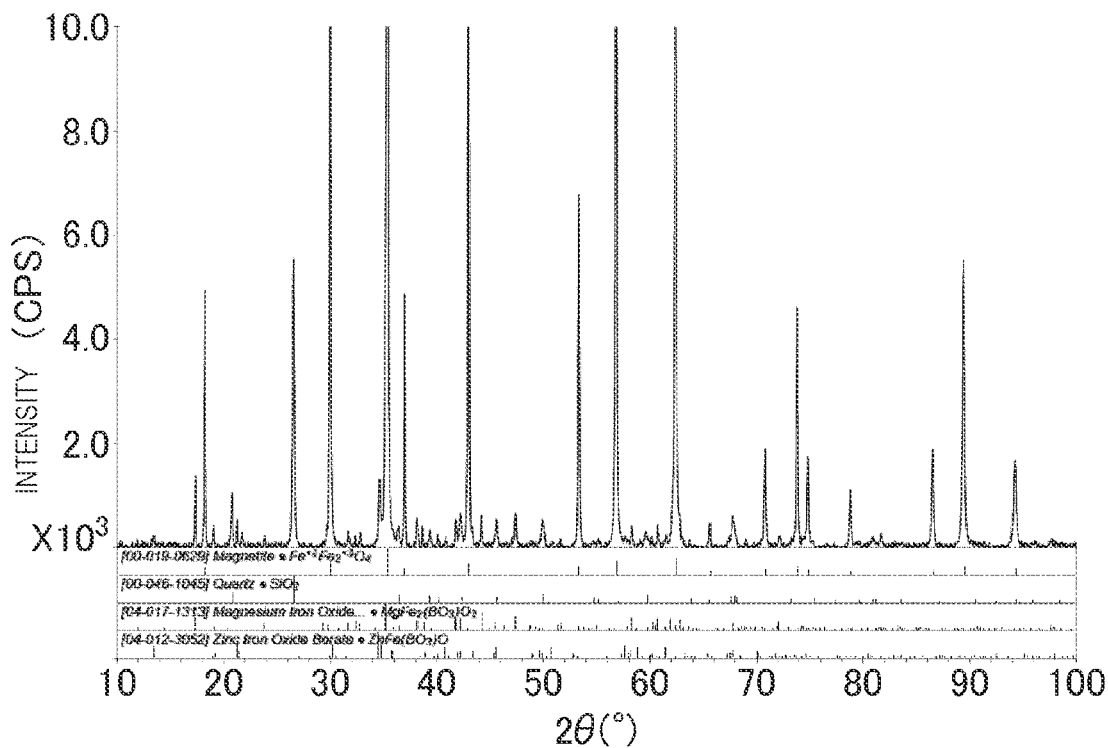
FIG. 5 illustrates an X-ray diffraction pattern for a test piece prepared in Example 6.

FIG. 5 illustrates an X-ray diffraction pattern for a test piece prepared in Example 6.

Measurement of Coefficient of Linear Expansion

The coefficients of linear expansion at 700° C. were measured with thermomechanical analysis (TMA) using the manufactured prism-shaped test pieces. The results are illustrated in Table 1 below and FIG. 6.

Figure 6:
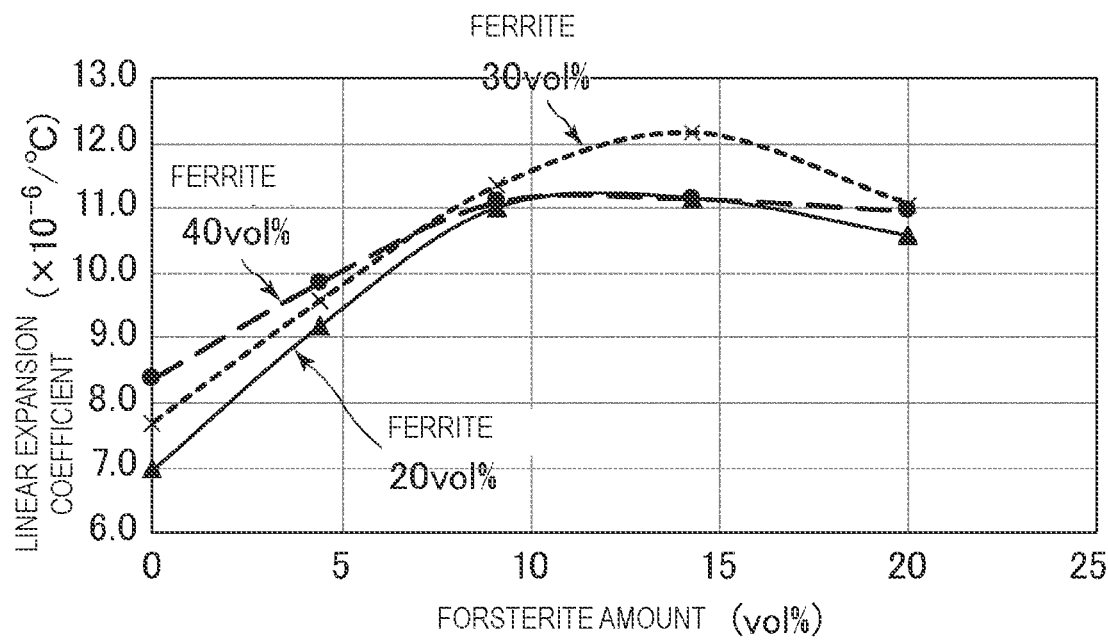
FIG. 6 is a graph illustrating the coefficients of linear expansion at 700° C. of test pieces manufactured in Examples 1 to 12 and Comparative Examples 1 to 3.

FIG. 6 is a graph illustrating the coefficients of linear expansion at 700° C. of test pieces manufactured in Examples 1 to 12 and Comparative Examples 1 to 3.

Evaluation of Presence/Absence of Cracks

The manufactured multilayer coil components were observed using a digital microscope (VHX-6000 made by Keyence) and the presence or absence of cracks was evaluated.

100 test pieces were evaluated for each multilayer coil component and the results are illustrated in below Table 1 with components where cracks did not appear in any of the test pieces indicated by ○, components where cracks appeared in from 1 to less than 10 of the test pieces indicated by Δ, and components where cracks appeared in 10 or more of the test pieces indicated by x.

TABLE 1

| | VOL % | | | X-RAY DIFFRACTION | | | | | LINEAR EXPANSION COEFFICIENT ($\times 10^{-6}/°$ C.) AT 700° C. | CRACK OCCURRENCE STATE |
|---|---|---|---|---|---|---|---|---|---|---|
| | FERRITE MATERIAL | DIELECTRIC GLASS MATERIAL | FOR-STERITE | SPINEL | QUARTZ | CRYSTAL A | CRYSTAL B | FOR-STERITE | | |
| COMPARATIVE EXAMPLE 1 | 40 | 60 | 0 | ○ | ○ | x | x | x | 8.4 | x |
| EXAMPLE 1 | 40 | 55.6 | 4.4 | ○ | ○ | ○ | ○ | x | 9.9 | Δ |
| EXAMPLE 2 | 40 | 50.9 | 9.1 | ○ | ○ | ○ | ○ | x | 11.1 | ○ |
| EXAMPLE 3 | 40 | 45.7 | 14.3 | ○ | ○ | x | ○ | ○ | 11.2 | ○ |
| EXAMPLE 4 | 40 | 40 | 20 | ○ | ○ | x | ○ | ○ | 11.0 | ○ |
| COMPARATIVE EXAMPLE 2 | 30 | 70 | 0 | ○ | ○ | x | x | x | 7.7 | x |
| EXAMPLE 5 | 30 | 65.6 | 4.4 | ○ | ○ | ○ | ○ | x | 9.6 | Δ |
| EXAMPLE 6 | 30 | 60.9 | 9.1 | ○ | ○ | ○ | ○ | x | 11.3 | ○ |
| EXAMPLE 7 | 30 | 55.7 | 14.3 | ○ | ○ | x | ○ | ○ | 12.2 | ○ |
| EXAMPLE 8 | 30 | 50 | 20 | ○ | ○ | x | ○ | ○ | 11.1 | ○ |
| COMPARATIVE EXAMPLE 3 | 20 | 80 | 0 | ○ | ○ | x | x | x | 7.0 | x |
| EXAMPLE 9 | 20 | 75.6 | 4.4 | ○ | ○ | ○ | ○ | x | 9.2 | Δ |
| EXAMPLE 10 | 20 | 70.9 | 9.1 | ○ | ○ | ○ | ○ | x | 11.0 | ○ |
| EXAMPLE 11 | 20 | 65.7 | 14.3 | ○ | ○ | x | ○ | ○ | 11.2 | ○ |
| EXAMPLE 12 | 20 | 60 | 20 | ○ | ○ | x | ○ | ○ | 10.6 | ○ |

As can be seen from Table 1, it is clear that spinel-type ferrite crystals, quartz crystals, and crystals B were generated due to the inclusion of forsterite in the insulating layers.

Furthermore, it is clear that crystals A were also generated when forsterite was in a range from 4.4 vol % to 9.1 vol % and that forsterite was also present when forsterite was in a range from 14.3 vol % to 20 vol %.

In addition, the results show that generation of cracks was suppressed in Examples 1 to 12 in which the coefficient of linear expansion of the insulating layers at 700° C. was $9 \times 10^{-6}$/K or higher.

In particular, no cracks were seen in Examples 2 to 4, 6 to 8, and 10 to 12 in which the coefficient of linear expansion of the insulating layers at 700° C. was $10 \times 10^{-6}$/K or higher. This is thought to be because the difference between the coefficient of linear expansion of the insulating layers at 700° C. and the coefficient of linear expansion of silver at 700° C. ($18.9 \times 10^{-6}$/K) is smaller and stress generated due to the difference between these coefficients of linear expansion during a fall in temperature during the baking of the base electrodes is reduced.

What is claimed is:
1. A multilayer coil component comprising:
   a multilayer body in which a plurality of insulating layers are stacked in a stacking direction, and a coil inside the multilayer body; and
   outer electrodes that are on surfaces of the multilayer body and are electrically connected to the coil, wherein the insulating layers include a spinel-structure ferrite phase and a ZnFe(BO$_3$)O-type crystalline phase.

2. The multilayer coil component according to claim 1, wherein
a coefficient of linear expansion of the insulating layers at 700° C. is 9×10$^{-6}$/K or higher.

3. The multilayer coil component according to claim 2, wherein
the coefficient of linear expansion of the insulating layers at 700° C. is 10×10$^{-6}$/K or higher.

4. The multilayer coil component according to claim 3, wherein
the insulating layers further include a forsterite crystalline phase.

5. The multilayer coil component according to claim 4, wherein
the insulating layers further include a quartz crystalline phase.

6. The multilayer coil component according to claim 4, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

7. The multilayer coil component according to claim 3, wherein
the insulating layers further include a quartz crystalline phase.

8. The multilayer coil component according to claim 3, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

9. The multilayer coil component according to claim 2, wherein
the insulating layers further include a forsterite crystalline phase.

10. The multilayer coil component according to claim 9, wherein
the insulating layers further include a quartz crystalline phase.

11. The multilayer coil component according to claim 9, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

12. The multilayer coil component according to claim 2, wherein
the insulating layers further include a quartz crystalline phase.

13. The multilayer coil component according to claim 12, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

14. The multilayer coil component according to claim 2, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

15. The multilayer coil component according to claim 1, wherein
the insulating layers further include a forsterite crystalline phase.

16. The multilayer coil component according to claim 15, wherein
the insulating layers further include a quartz crystalline phase.

17. The multilayer coil component according to claim 15, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

18. The multilayer coil component according to claim 1, wherein
the insulating layers further include a quartz crystalline phase.

19. The multilayer coil component according to claim 18, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

20. The multilayer coil component according to claim 1, wherein
the ferrite phase is a spinel-structure magnetic phase containing at least Fe, Ni, Zn, and Cu, and
the insulating layers include a non-magnetic phase containing at least the ZnFe(BO$_3$)O-type crystalline phase and Si.

* * * * *